(No Model.)
C. F. SCOTT & B. G. LAMME.
SYSTEM OF ELECTRICAL DISTRIBUTION.
No. 606,589. Patented June 28, 1898.
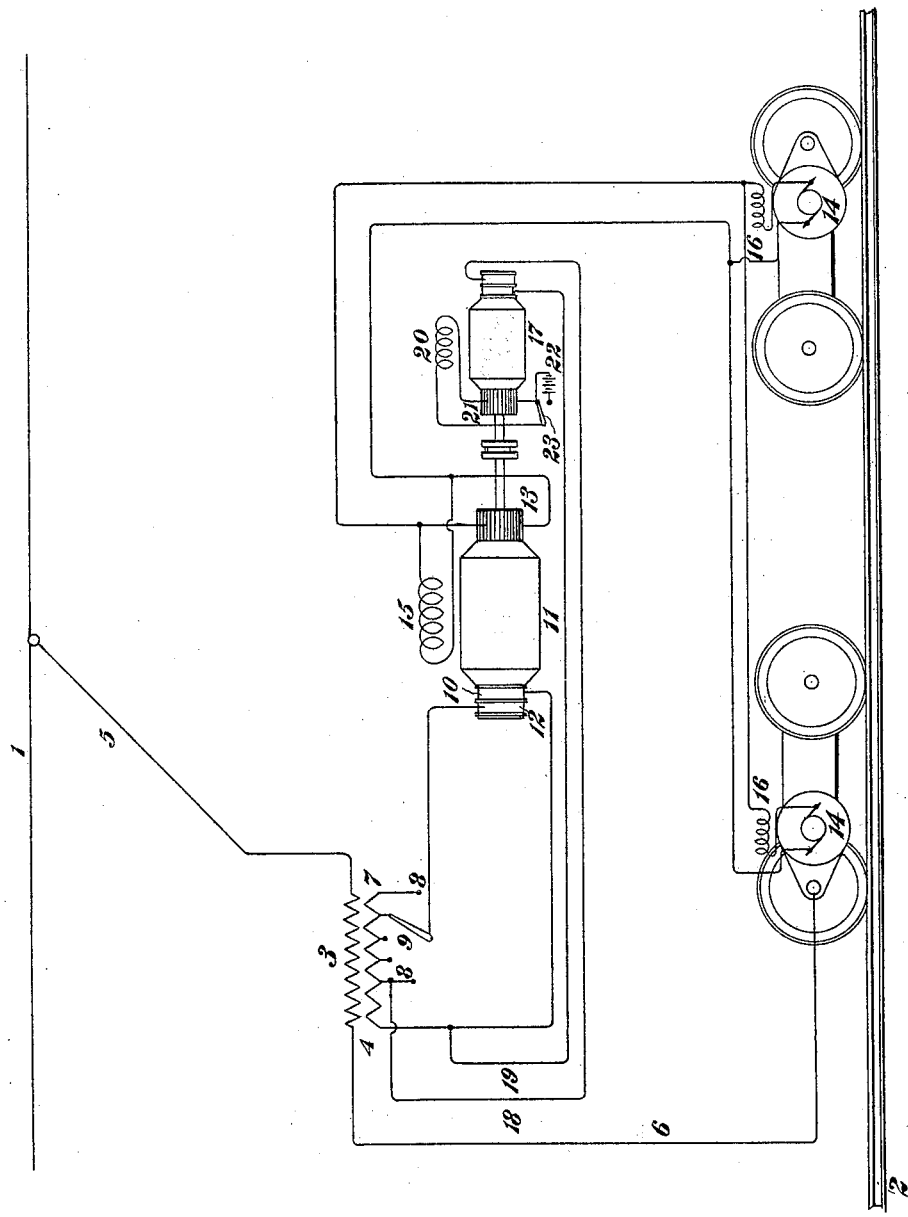
WITNESSES:
INVENTORS
Charles F. Scott
Benjamin G. Lamme
BY
Wesley G. Carr
ATTORNEY.

UNITED STATES PATENT OFFICE.

CHARLES F. SCOTT AND BENJAMIN G. LAMME, OF PITTSBURG, PENNSYLVANIA, ASSIGNORS TO THE WESTINGHOUSE ELECTRIC AND MANUFACTURING COMPANY, OF SAME PLACE.

SYSTEM OF ELECTRICAL DISTRIBUTION.

SPECIFICATION forming part of Letters Patent No. 606,589, dated June 28, 1898.

Application filed January 28, 1897. Serial No. 621,123. (No model.)

*To all whom it may concern:*

Be it known that we, CHARLES F. SCOTT and BENJAMIN G. LAMME, citizens of the United States, residing in Pittsburg, in the county of Allegheny and State of Pennsylvania, have invented a new and useful Improvement in Systems of Electrical Distribution, (Case No. 729,) of which the following is a specification.

Our invention relates to systems of electrical distribution, and it has particular reference to systems employed in connection with electrical railways, although not necessarily restricted to such use.

The object of our invention is to provide a system of distribution by means of which an alternating-current circuit having an approximately constant electromotive force may be utilized for the operation of direct-current motors at variable speed.

In order to operate direct-current electric motors at different speeds, it is usual to vary the electromotive force applied to them by means of adjustable rheostats; but this method is open to objection on account of the losses due to the insertion of resistance in the armature-circuits.

In order that the well-known advantage of alternating currents in the transmission of energy over long distances may be utilized for railway-work, it has been proposed to employ alternating-current motors for propelling railway-vehicles. Single-phase alternating-current motors have been found to be unsuited to practical conditions, however, because they are not self-starting and can only be run efficiently at synchronous speed. It has also been found impracticable to employ multiphase motors for the propulsion of railway-vehicles by reason of the fact that they cannot be operated efficiently at the different speeds necessary in such relations, their maximum efficiency being secured at or near synchronous speed.

In order to secure the advantage of line-transmission by means of alternating currents and also to secure the variation of speed in the motors required in railway-work, we propose to employ a rotary transformer which receives current from the alternating-current circuit and transmits direct current to the motors. As the voltage supplied by the direct-current end of the transformer is directly dependent upon the electromotive force applied to the alternating-current end, we propose to secure the variable electromotive force for variable speed in direct-current motors by varying the electromotive force supplied to the rotary transformer. This may be effected by various means. As the electromotive force of the line-circuit may be considerably in excess of the maximum electromotive force suitable for the direct-current motors, a stationary step-down transformer may be included between such alternating-current circuit and the rotary transformer, and in order to vary the voltage applied to the rotary transformer the length of either the primary or secondary winding on the stationary transformer may be varied, or a regulator may be employed in which the number of turns is constant in both elements but the mutual relation of the two elements is varied. In case an autoconverter having a single coil is employed loops may be brought out from such coil in such manner that connection may be made therewith so as to obtain the variable voltage desired.

In the accompanying drawing one conductor of the alternating-current-supply circuit is shown as an overhead conductor 1 and the track-rails 2, bonded and connected as usual in electric railways, constitute with the ground the other side of such circuit. The primary 3 of a stationary transformer 4, carried upon the vehicle to be driven, is connected across the alternating-current circuit by means of a suitable contact device 5 and a conductor 6, leading to the contact-rails 2 by means of the wheels of the vehicle or other suitable device making contact therewith. The secondary 7 of the transformer 4 is shown as provided with a plurality of loops brought out to contact-points 8, with which a movable switch-arm 9 engages. One end of the secondary 7 is connected to a brush-bearing on one of the collector-rings 10 of the rotary transformer 11, and the switch-arm 9 is connected to the brush-bearing on the other collector-ring 12. It will be seen from this construction that as the switch-arm 9 is moved from one contact-point 8 to another the active length of the secondary of the transformer will be varied, and consequently the electromotive force applied to the rotary transformer 11 will be varied, the number of contact-points 8 depending upon the variation of voltage desired. The leads from the commutator 13 of the rotary transformer extend directly to the brushes of the railway-motors 14. These motors are shown as connected in parallel; but it is obvious that they may be connected in series, if desired. The particular type of rotary transformer employed is not material; but we prefer to employ a transformer in which the armature has a single winding and the field-magnet of which has a shunt-winding 15, as indicated. The motors 14 are shown as provided with series field-magnet windings 16; but our invention is not limited in this regard. If series-wound field-magnets are employed, the speed of the motors will be dependent both upon the load and upon the voltage applied, and consequently the speed with any load may be varied over a wide range by means of changes in the electromotive force applied. If shunt-wound motors are employed, the field-windings may be supplied with current either from a second rotary transformer supplying current at a constant electromotive force or from an independent source, in which case the speed will depend within close limits upon the electromotive force applied. If shunt-wound motors are employed and the energizing-current is derived from the rotary transformer 11, which gives a variable electromotive force, a rheostat will be necessary in the field-circuit. The rotary transformer 11 may under certain conditions be run without the application of other power; but in cases where the electromotive force is varied over a very wide range it will probably be necessary, in order to secure a constant synchronous speed, to provide a driving means for such transformer the speed of which will not be in any way dependent upon such variable electromotive force. We have shown as such means a small synchronous motor 17, the armature of which is coupled directly to the armature of the rotary transformer 11, and the winding of which is supplied with current from the secondary 7 of the stationary transformer 4, the leads 18 and 19 being connected to points in said secondary which give a constant electromotive force. The field-winding 20 of the synchronous motor 17 may be excited from any suitable source. In the present instance we have shown the machine as self-excited, a commutator 21 being provided with which the terminals of the winding 20 are connected. As the motor 17 is not self-starting, we have shown a small secondary battery 22 for providing the necessary energy for starting the motor, and a switch 23 for cutting the battery out of circuit when the motor has attained synchronous speed. Any other suitable starting means may be employed.

The system above described is especially applicable to railway-work where it is desirable to employ an alternating-current-transmission circuit of high voltage, and at the same time to employ direct-current motors of standard type, which will operate efficiently at all speeds. In this system the current required for starting and accelerating the speed will be in approximate proportion to the actual power expended. The system is also applicable to the operation of hoists, in which considerable speed variations are required.

While we have shown a single-phase alternating-current circuit, it will be understood that the system is also applicable to and intended for multiphase circuits.

We claim as our invention—

1. A system of electrical distribution comprising an alternating-current-supply circuit, one or more direct-current motors, a rotary transformer taking alternating current from said supply-circuit and supplying direct current to said motor or motors and means for varying the alternating-current electromotive force supplied to the rotary transformer and thereby varying the direct-current electromotive force and consequently the speed of the motors.

2. A system of electrical distribution comprising an alternating-current-supply circuit, one or more direct-current motors, a rotary transformer receiving alternating currents from said supply-circuit and supplying direct current to said motors, a stationary transformer interposed between the source of alternating current and the rotary transformer and means for varying the electromotive force supplied by the stationary-transformer secondary and thereby varying the speed of the motors.

3. A system of electrical distribution comprising an alternating-current-supply circuit, a stationary transformer the primary winding of which receives current from said supply-circuit, a rotary transformer supplied from the secondary of said stationary transformer, one or more direct-current motors connected to the direct-current terminals of the rotary transformer and means for varying the active length of the secondary winding of the stationary transformer and thereby varying the speed of the motor or motors.

4. A system of electrical distribution comprising an alternating-current-supply circuit, a rotary transformer, means for driving the same at synchronous speed, one or more direct-current motors connected to the direct-current terminals of said transformer, and means interposed between said transformer and the alternating-current-supply circuit for varying the electromotive force applied to the transformer and thereby varying the speed of the motor or motors.

In testimony whereof we have hereunto subscribed our names this 26th day of January, A. D. 1897.

CHAS. F. SCOTT.
BENJ. G. LAMME.

Witnesses:
WESLEY G. CARR,
HUBERT C. TENER.